Sept. 2, 1930.  E. LORENZEN  1,774,717
GRAIN HULLER
Filed Oct. 26, 1928   3 Sheets-Sheet 1
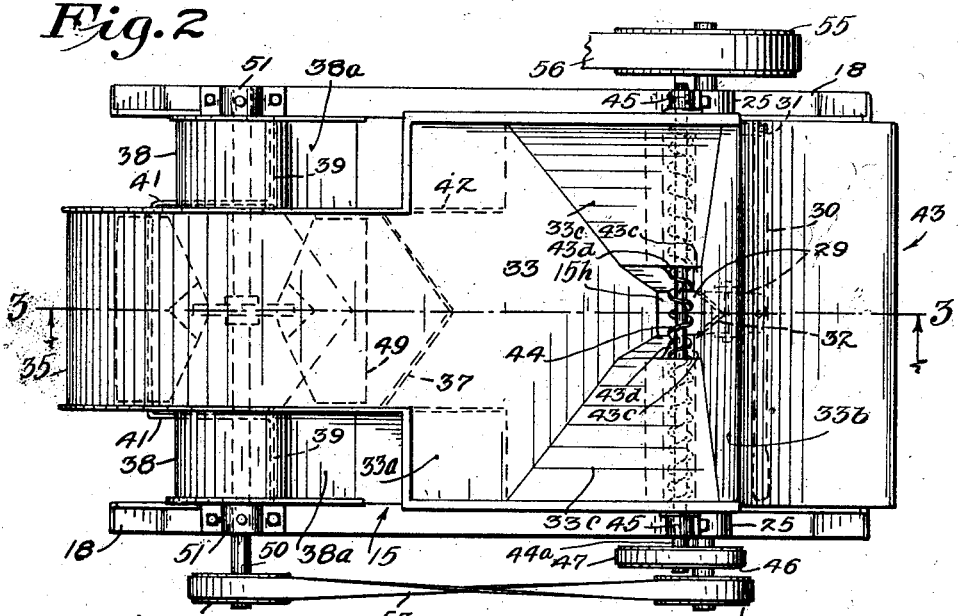
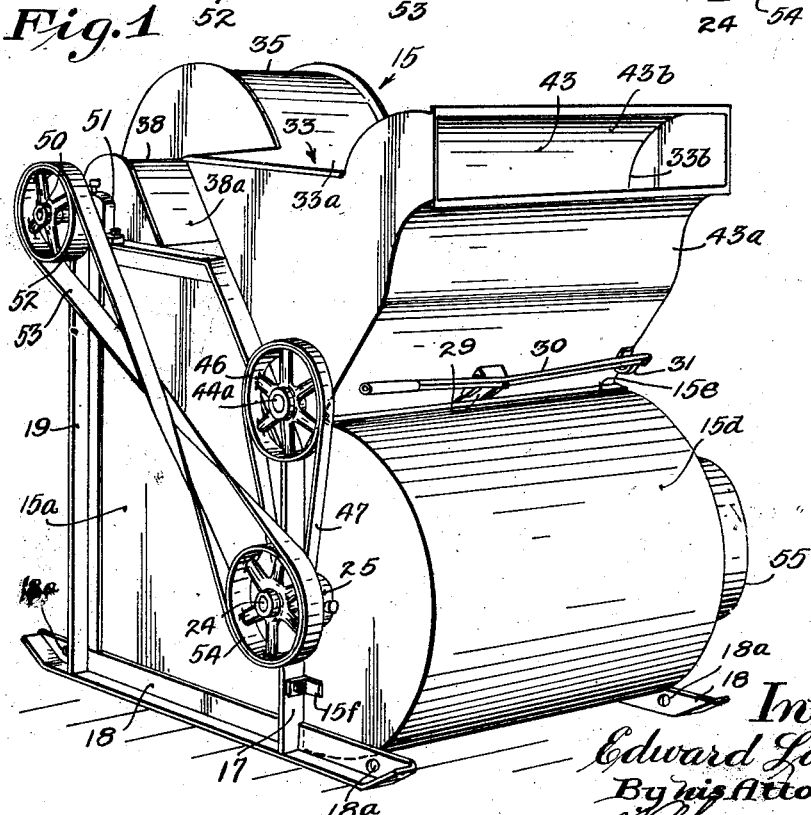
Inventor
Edward Lorenzen
By his Attorneys
Reif & Williamson Sept. 2, 1930.  E. LORENZEN  1,774,717
GRAIN HULLER
Filed Oct. 26, 1928  3 Sheets-Sheet 2
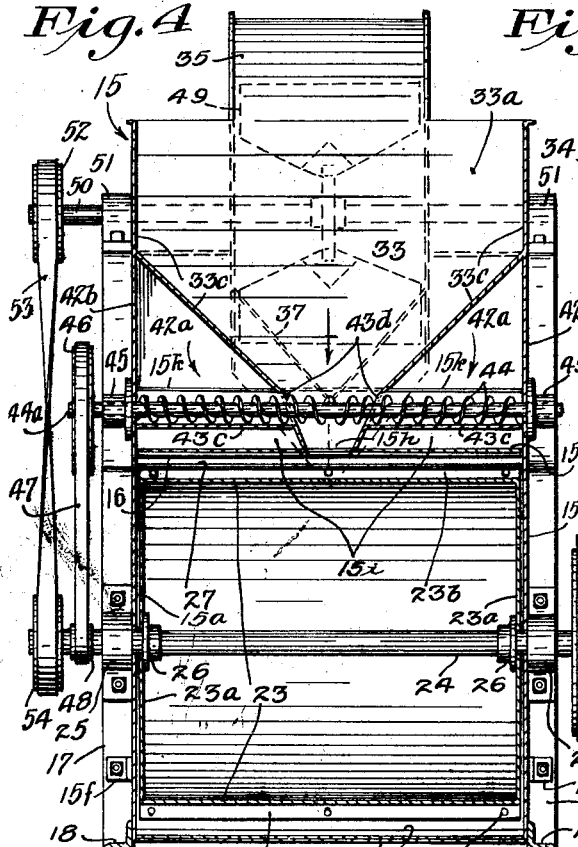
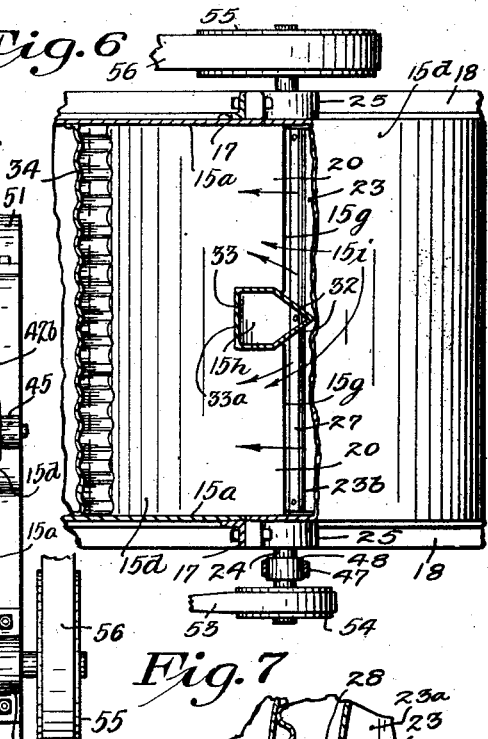
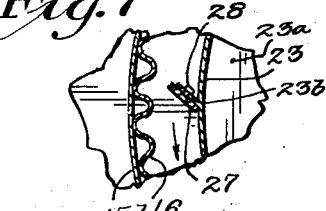
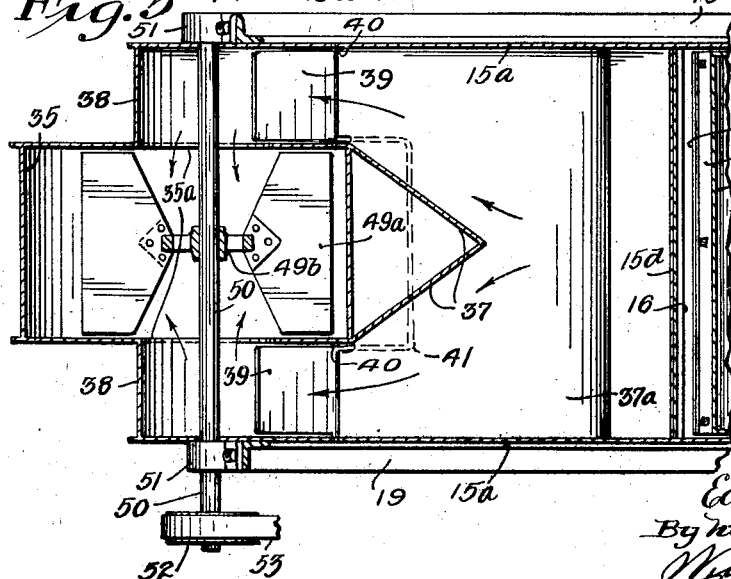
Inventor
Edward Lorenzen
By his Attorneys Sept. 2, 1930.                  E. LORENZEN                 1,774,717
                                 GRAIN HULLER
                             Filed Oct. 26, 1928           3 Sheets-Sheet 3
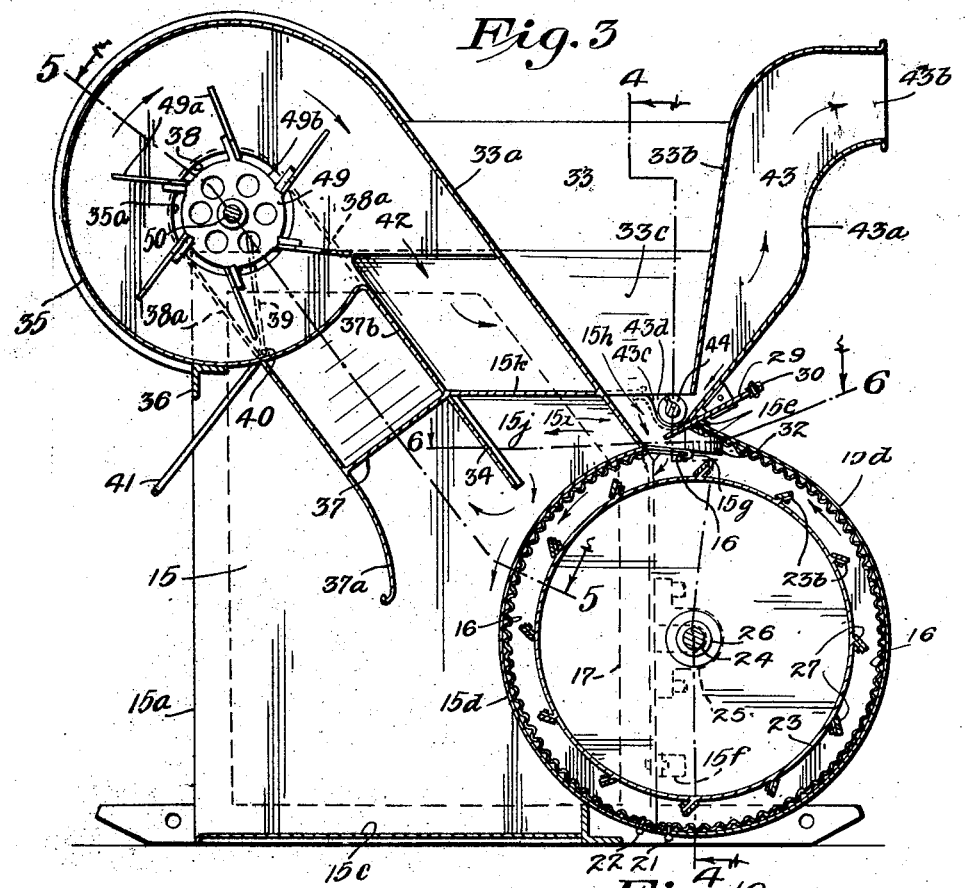
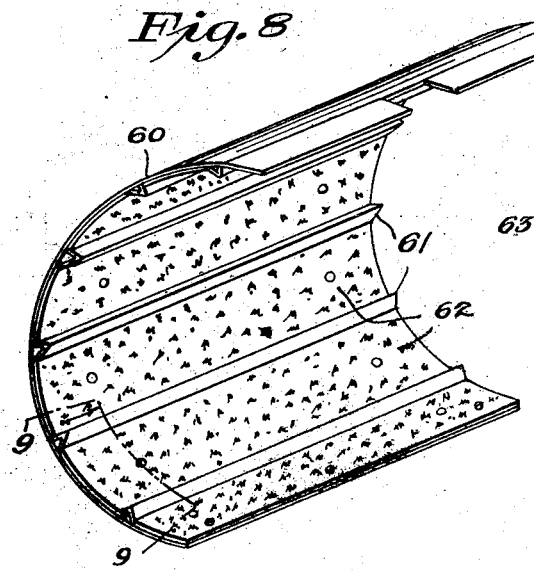
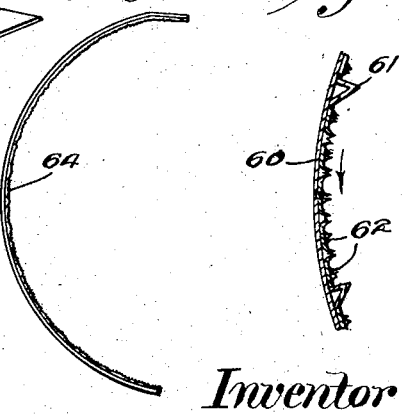
Inventor
Edward Lorenzen
By his Attorneys Patented Sept. 2, 1930

1,774,717

UNITED STATES PATENT OFFICE

EDWARD LORENZEN, OF MARSHALLTOWN, IOWA

GRAIN HULLER

Application filed October 26, 1928. Serial No. 315,238.

This invention relates to a grain hulling machine and while the invention is applicable for hulling and cracking various kinds of grain, it is particularly designed for hulling oats.

Oats is now used largely as a stock food and it has been found that it makes a much better stock food when hulled. It is desirable to have a machine which will efficiently hull the oats, one which will have a good capacity and one which can be operated without excessive power. It is also desirable to have means for separating the grain from the hulls, together with means for returning any unhulled grain to the hulling means.

It is an object of this invention, therefore, to provide a machine comprising a simple and efficient grain hulling and separating device.

It is a further object of the invention to provide a grain or oat hulling device comprising a hulling means and a novel and efficient form of separating means.

It is another object of the invention to provide a grain or oat hulling device comprising a casing having a grain hulling means therein, a chamber for receiving the hulled grain, a separating means for the grain and hulls including a fan, together with means for collecting and returning to the hulling means any unhulled grain.

It is more specifically an object of the invention to provide a grain or oat hulling machine, comprising a casing having a cylindrical hulling means at one end, a grain collecting chamber at its other end into which the material from the hulling means is directed, a hopper above and feeding to said grain hulling means, a fan and casing at one side of said hopper and a discharge conduit at the other side of said hopper having passages communicating with the discharge conduit of said fan and disposed at each side of said hopper.

These and other objects and advantages of the invention will be fully set forth in the following description made in connection with the accompanying drawings, in which like reference characters refer to similar parts throughout the several views, and in which:—

Fig. 1 is a perspective view of the interior of the machine;

Fig. 2 is a top plan view thereof;

Fig. 3 is a vertical section in line with 3—3 of Fig. 2, as indicated by the arrow;

Fig. 4 is a vertical section taken on line 4—4 of Fig. 3, as indicated by the arrow;

Fig. 5 is a horizontal section taken on line 5—5 of Fig. 3, as indicated by the arrow;

Fig. 6 is a horizontal section taken on line 6—6 of Fig. 3, as indicated by the arrow;

Fig. 7 is a fragmentary view of a portion shown in Fig. 3, the same being shown on an enlarged scale;

Fig. 8 is a perspective view of a section of the hulling casing wall showing a modification;

Fig. 9 is a partial section taken on line 9—9 of Fig. 8, as indicated by the arrow, and Fig. 10 is a vertical transverse section through a modified form of hulling cylinder wall.

Referring to the drawings, the machine as shown comprises a casing 15 having substantially vertical side walls $15^a$, said wall forming with the bottom $15^c$ of the casing, a substantially rectangular chamber open at its rear side. Said casing has at its front end a cylindrical portion or casing $15^d$ which extends between the side walls $15^a$. Said casing $15^d$ has on its interior wall a corrugated covering 16, the corrugations of which extend longitudinally of said casing. The casing $15^d$ comprises an outer section of substantially semi-cylindrical form which has its upper edge received in a slot formed by projecting plates $15^e$ and the same is provided with lugs $15^f$ bolted to vertical angle members 17 disposed at the outer side of casing 15 and along the side walls $15^a$, said angle members extending rearwardly and horizontally to the rear of said side walls. The other or rear section of casing $15^d$ is secured in fixed position by the side walls $15^a$, the same having at its top a hook portion $15^g$ engaging around the end of wall 16. The angle members 17 are received at their bottoms in horizontal angle members 18 at each side and the bottom of casing 15 which form supports for said casing. The horizontal flanges of angle members 18 are bent upwardly at each end as shown in Fig. 1 so that said members form in effect runners and the vertical flanges have holes 18$^a$ therethrough adjacent their ends through which traction or securing devices may be inserted. Vertical angle members 19 extend along the rear side of casing 15, said angle members meeting the angle members 17 at their upper ends.

The inner wall 16, forming part of the hulling means also preferably is made in two sections, the outer one of which has its upper edge received in the slot between the plates 15$^e$ and has its lower end bolted to the outer section of casing 15$^d$ by the bolts 21. The inner section of wall 16 has its upper end received in the hook portion 15$^k$ and its lower end bolted to the bottom of the inner section of 15$^d$ by the bolts 22. A rotatable hulling means is provided comprising a cylinder 23 secured to the shaft 24 journaled in bearings 25 bolted to the vertical members 17. Said shaft 25 extends through to side walls 15$^a$ and has flanged collars 26 secured thereto to which the end walls 23$^a$ of cylinder 23 are secured. Cylinder 23 has circumferentially spaced projecting lugs or plates 23$^b$ on its outer side extending oppositely to the direction of rotation of cylinder 23 and at an angle of substantially 45 degrees. These lugs 23$^b$ have bolted thereto hulling plates or bars 27, the outer edges of which project beyond the outer edges of lugs 23$^b$. The holes through lugs 23$^b$ through which pass the bolts 28 securing bars 27 thereto preferably will be somewhat elongated to permit outward adjustment of said bars.

The casing 15 has an opening 15$^h$ at its upper side and at the central portion thereof, as shown in Figs. 2 and 3, which opening is regulated by a slide plate 29 having its outer end secured intermediate the ends of an adjusting lever 30 having one end pivoted to a lug 31 on the outer side of casing 15. A deflector 32 is secured to the inner wall of casing 16 adjacent opening 15$^h$ and to the right thereof as shown in Fig. 3, said deflector being of angular or pointed shape with the point directed away from the opening 15$^h$.

A hopper 33 is disposed above casing 15 having side walls 33$^a$ and 33$^b$ which converge downwardly to the opening 15$^h$, the lower portions of which also converge downwardly to the opening 15$^h$. The casing 15$^d$ and wall 16 also have openings 15$^i$ at their upper sides at either side of the opening 15$^h$, which openings communicate at either side of hopper 33 with a passage 15$^j$ as indicated by the substantially horizontal arrows above the rear section of casing 15$^d$ as shown in Fig. 3 and by the arrows shown in Fig. 6. The passage 15$^j$ has a top wall 15$^k$, and a baffle plate 34 extends downwardly and forwardly from the front end of said wall against which the material issuing from openings 15$^i$ engages, which will be later described. The baffle plate 34 is provided with downwardly extending corrugations, as shown in Fig. 6.

A fan casing 35 is disposed at the top of casing 15, at the rear end thereof and centrally between the sides thereof, the same being shown as being supported upon a transversely extending angle member 36 which extends between angle members 19. A deflector 37 having downwardly converging walls meeting in a line is disposed below casing 35 and the same has a projection 37$^a$ at its rear side extending downwardly and curved somewhat to the rear, said deflector being disposed in the casing 15 and extending across the full width thereof. The fan casing 35 has circular openings or eyes 35$^a$ at the sides thereof with which communicate conduits or extensions 38 having cylindrical upper ends and downwardly and forwardly extending substantially parallel walls 38$^a$, said conduits having open ends below casing 35 and at each side of deflector 37, thus opening into casing 15. Regulating plates 39 are disposed in said conduits 38 between the walls 38$^a$ mounted to swing about a common pivot 40, substantially at the bottom of casing 35, said plates being connected to a yoke or bail 41, which extends rearwardly between the side walls 15$^a$. The casing 35 has a discharge passage 42 extending tangentially therefrom, the top of which is formed by the rear hopper wall 33$^a$, and the bottom of which is formed by the wall 15$^k$ as well as the wall 37$^b$ at the top of the deflector 37. This discharge passage divides into two passages 42$^a$, which extends on either side of hopper 33 beneath the end walls 33$^c$ of the hopper and within side walls 42$^b$ which are in alinement with the side walls 15$^a$. These passages 42$^a$ communicate at their front ends with a common passage 43 beyond front wall 33$^b$ of the hopper, which forms the rear wall of passage 43, said passage having a curved front wall 43$^a$ and the side walls 42$^b$, said passage having an open discharge end 43$^b$ at its upper front side, which opening is directed forwardly as clearly shown in Figs. 1 and 3. The passage 43 as clearly shown in Fig. 3 converges towards its bottom, and a bottom wall 43$^c$ is provided and a screw conveyor 44 is disposed adjacent this wall which extends around the lower portion of the conveyor. The conveyor 44 has a screw blade of opposite pitch at each end so that material is conveyed to the center thereof. The passages 42$^a$ and 43 which communicate at their lower portions communicate through openings 43$^d$ with the lower part of hopper 33 so that material moved inwardly by the conveyor 44 drops in the lower portion of said hopper and can pass through opening 15$^h$. A shaft 44$^a$ of conveyor 44 is journaled in bearings 45 secured to members 17. One end of said shaft extends beyond one of said bearings and has secured thereto a pulley 46 over which runs a belt 47 also running over a pulley 48 secured to one end of shaft 24. A fan 49 is disposed in casing 35 having blades 49ª secured to a spider or hub member 49ᵇ which is secured to a shaft 50 journaled in bearings 51 secured to the top horizontal portions of members 17. Said shaft extends beyond one of said bearings and has secured thereto a pulley 52 over which runs a cross belt 53, also running over a pulley 54 secured to the outer end of shaft 24. Shaft 24 has secured to its opposite end beyond its bearing 25 a pulley 55 over which runs a driving belt 56. This will be connected to a suitable power pulley.

In operation the grain to be cleaned, such as oats will be placed in the hopper 33. Power will be applied to belt 56 and pulley 55 so that cylinder 23 will be rotated at high speed. The grain feeds down through the opening 15ʰ and passes into casing 15ᵈ within the wall 16. The grain is carried around by the cylinder 23 and particularly the blades 27 and impacted by said blades and thrown against the corrugations of wall 16. The grain is effectively hulled and as it sweeps around the wall 16 as indicated by the arrow in Fig. 3, it is deflected at either side of the bottom of hopper 33 by deflector 32 and passes out through the openings 15ⁱ. This grain which is discharged from the casing 15ᵈ with great force is thrown against the baffle plate 34. The grain is thus checked in its movement and drops by gravity from the end of said plate, as indicated by the arrows in Fig. 3. The corrugations in plate 34 tend to distribute the grain evenly thereover and the grain passes down in the groove formed by said corrugations. The fan 49 is driven from the shaft 24 through the belt 53 and a strong suction is exerted through the eyes 35ª of the fan casing 35. The material passing around the ends of baffle plate 34, is encountered by a strong current of air moving upwardly into the eye of the fan through the conduits 38 and the loose hulls and the unhulled and partly hulled grain are carried upwardly into the fan casing 35. The force of the draught or air current passing into the fan can be regulated by adjustment of the plates 39, this being done by moving the bail 41. Said plates and bail are constructed to be frictionally held in the position to which they are moved. The hulled grain drops down on the floor 15ᵉ and this can be shoveled up and removed from the rear side of the machine. The hulls, with the unhulled and partly hulled grain pass through casing 35 and are discharged by the fan through discharge passage 42. This material encounters the rear side 33ª of hopper 33 and is divided into two streams which pass respectively through the passages 42ª, which, as stated, are at either side of hopper 33. Material, after passing the hopper and front wall 33ᵇ thereof, passes into the common passage 43. The area of the passage for this material is here greatly increased, and the velocity of the air current diminished. The hulls are carried upward as shown by the arrows in Fig. 3 and discharged through the opening 43ᵇ. Any unhulled or partly hulled grain drops to the bottom of passage 43, onto the wall 43ᶜ and onto the trough formed thereby about the conveyor 44. Said conveyor is rotated from shaft 24 through the belt 47 and the unhulled and partly hulled grain is moved inwardly and passes through the openings 43ᵈ into the bottom of hopper 33 so that it is again passed into the casing 15ᵈ and will be again treated by the huller. The feed of the material into the hulling means can be regulated by adjustment of the plate 29. The plate 37ª limits the area of the suction through the fan casing 35. The material is thus continuously fed to the machine and the unhulled and partly hulled grain is constantly returned to the hulling means so that only the hulled grain drops onto the floor 15ᶜ. The machine thus operates continuously to produce perfectly hulled grain and it is unnecessary to separate the product and handle the hulled or partially hulled grain to return it for further hulling.

In Fig. 8 a section of wall 60 is shown which is of semi-cylindrical form having longitudinally extending ribs 61, said ribs being of triangular shape. In cross section it will be noted that one side of said ribs extends substantially radially, while the other is inclined at an angle of substantially 45 degrees to the radius. The wall between the ribs 61 is formed of sheet metal with stuck-up pointed projections 62. The wall sections in Figs. 8 and 9 will be used when the machine is used for cracking corn and operating on other grains than oats.

In Fig. 10 a further modified form of semi-cylindrical wall 63 is shown. This section has a layer of coarse sand paper 64 on its inner side. Such a wall will be used for certain scouring operations and for scarifying clover seed. It will be understood that the sections shown in Figs. 8, 9 and 10 will be substituted for the wall 16 shown in Fig. 3.

From the above description it is seen that applicant has provided a very simple and efficient machine for hulling oats and treating other grains. The machine operates continuously to produce the completely hulled oats and the structure is simple and can be made very rugged and durable. The machine has been amply demonstrated in actual practice and found to be very successful.

It will, of course, be understood that various changes may be made in the form, details, arrangement and proportions of the apparatus without departing from the scope of applicant's invention, which, generally stated, consists in an apparatus capable of carrying out the objects above set forth, such as disclosed and defined in the appended claims.

What is claimed is:—

1. A machine of the class described, having in combination, a casing having substantially vertical parallel side walls, a cylindrical portion at one end thereof and at its bottom, comprising a grain hulling means, a fan casing at its other end and top, and an open chamber at said latter end at its bottom, a passage leading from said cylindrical portion to said chamber and a passage leading from said fan casing to said chamber forming an inlet for said fan casing, a hopper above said cylindrical portion and at one side of said fan casing communicating at its bottom with said cylindrical portion, an outlet passage at the side of said hopper opposite said fan casing and discharge passages from said fan casing leading to said outlet passage and disposed at either side of said hopper.

2. The structure set forth in claim 1 and a baffle plate disposed in said chamber adjacent the discharge opening from said casing against which the material is thrown which is discharged from said hulling means.

3. A machine of the class described having in combination, hulling means comprising a cylindrical casing, a hopper disposed above said cylindrical casing and having a tapered lower end communicating with said casing at its central portion, said casing having outlet openings at each side of said hopper, a chamber communicating with said outlet openings, a fan casing at one side of said hopper having a downwardly directed inlet passage communicating with said chamber and having discharge passages disposed at each side of said hopper, a discharge passage at the side of said hopper opposite said fan casing with which said discharge passages communicate, means at the bottom of said last mentioned passage for collecting material settling therein and returning the same to said hopper.

4. A machine of the class described having in combination, a hulling means comprising a substantially cylindrical casing, a hopper disposed above said casing and having an opening at its lower end communicating with said casing substantially at the longitudinal center thereof, said casing having rearwardly directed discharge openings at its upper end at either side of the said first mentioned opening, a passage into which the material is discharged from said discharge openings, a chamber communicating with said passage for receiving the hulled grain, pneumatic means for removing the hulls, unhulled grain and partially hulled grain from said chamber, an outlet passage for discharging the hulls to which said pneumatic means delivers, means at the bottom of said outlet passage for collecting the unhulled grain and partially hulled grain and means for returning said unhulled grain and partially hulled grain to said hopper.

5. A machine of the class described having in combination, a hulling means comprising a substantially cylindrical casing, a hopper above said casing having a tapered lower end communicating with an opening in said casing, said casing having discharge openings at either side of said hopper, a passage into which the material passes from said last mentioned openings, a baffle means in said passage against which said material is discharged, a chamber communicating with said passage having means for receiving the hulled grain, a fan casing having an inlet conduit communicating with said chamber for removing therefrom the hulls, unhulled grain and partially hulled grain, discharge passages leading from said fan casing to either side of said hopper, an outlet passage with which said discharge passages communicate having an outlet opening for discharging said hulls and having bottom portions at either side of said hopper for collecting the unhulled and partially hulled grain, said bottom portions having openings communicating with said hopper and means for moving said unhulled grain and partially hulled grain through said openings into said hopper.

6. A machine of the class described having in combination, a grain hulling means comprising a casing, a hopper disposed thereabove and having an opening communicating with said casing, said casing having a discharge opening, a chamber into which the material from said casing is received, a fan casing enclosing a fan, having inlet passages communicating with said chamber and having a discharge passage, said discharge passage having branches disposed at each side of said hopper and an enlarged portion beyond said hopper having an open upper end, said discharge passage having a bottom portion communicating with the lower portion of said hopper.

7. A machine of the class described having in combination, a chamber adapted to receive material from a hulling means, an inclined baffle against which said material is thrown and down which it slides and from which it falls, suction means acting on said material as it falls from said baffle for drawing the hulls and unhulled material upwardly, a passage through which said hulls and unhulled material pass, an upwardly extending passage through which said hulls are blown and discharged by said suction means, a receptacle at the bottom of said last mentioned passage receiving said unhulled grain and means for moving said unhulled grain to said hulling means.

8. A machine of the class described having in combination, a hopper for receiving grain having an opening in its bottom through which grain is discharged to a hulling means, a chamber below said hopper into which hulled and unhulled grain and hulls are discharged from said hulling means, a fan, a fan casing enclosing said fan, a passage communicating with the inlet side of said fan casing and with said chamber to draw said unhulled grain and hulls upwardly into said fan casing, discharge passages leading from said fan at each side of said hopper through which the hulls and unhulled grain are discharged, a wide passage with which said passages communicate extending upwardly at one side of said hopper and having a discharge outlet at its upper end through which said hulls are discharged, means for collecting the unhulled grain at the bottom of said last mentioned passage and means for moving said unhulled grain to said hulling means.

In testimony whereof I affix my signature.

EDWARD LORENZEN.